US012610366B2

(12) United States Patent
Li et al.

(10) Patent No.: US 12,610,366 B2
(45) Date of Patent: Apr. 21, 2026

(54) RESOURCE DETERMINING METHOD, RESOURCE INDICATION METHOD, AND DEVICE

(71) Applicant: VIVO MOBILE COMMUNICATION CO., LTD., Dongguan (CN)

(72) Inventors: Gen Li, Dongguan (CN); Zichao Ji, Dongguan (CN); Siqi Liu, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 638 days.

(21) Appl. No.: 17/963,154

(22) Filed: Oct. 10, 2022

(65) Prior Publication Data

US 2023/0050298 A1     Feb. 16, 2023

Related U.S. Application Data

(63) Continuation of application No. PCT/CN2021/086793, filed on Apr. 13, 2021.

(30) Foreign Application Priority Data

Apr. 13, 2020    (CN) .......................... 202010287726.3

(51) Int. Cl.
    *H04W 72/1273*        (2023.01)
    *H04W 72/23*          (2023.01)
(52) U.S. Cl.
    CPC ....... *H04W 72/1273* (2013.01); *H04W 72/23* (2023.01)

(58) Field of Classification Search
    CPC ............. H04W 72/1273; H04W 72/23; H04W 72/0446; H04W 72/0453; H04W 72/232;
    (Continued)

(56)                References Cited

U.S. PATENT DOCUMENTS

2016/0100382 A1     4/2016  He et al.
2019/0159213 A1     5/2019  Baldemair et al.
                    (Continued)

FOREIGN PATENT DOCUMENTS

CN        101909356 A      12/2010
CN        103312467 A       9/2013
                    (Continued)

OTHER PUBLICATIONS

Extended European Search Report issued in related European Application No. 21789318.9, mailed Aug. 18, 2023, 10 pages.
(Continued)

*Primary Examiner* — Obaidul Huq
(74) *Attorney, Agent, or Firm* — IPX PLLC

(57)                ABSTRACT

A resource determining method, a resource indication method, and a device are provided. The resource determination method is performed by a user side device, including: obtaining time domain resource indication information of downlink control information (DCI), where the time domain resource indication information supports scheduling of multiple carriers or bandwidth parts (BWPs); and determining a scheduling time domain resource on the multiple carriers or BWPs according to the time domain resource indication information.

15 Claims, 3 Drawing Sheets

(58) Field of Classification Search
CPC .. H04W 72/0457; H04W 72/53; H04L 5/001;
H04L 5/0094; H04L 5/0053
USPC .......................................... 370/310, 328, 329
See application file for complete search history.

(56) References Cited

U.S. PATENT DOCUMENTS

| | | | |
|---|---|---|---|
| 2019/0306875 A1 | 10/2019 | Zhou et al. | |
| 2019/0349898 A1 | 11/2019 | Fu et al. | |
| 2020/0275430 A1* | 8/2020 | Salem | H04L 1/1614 |
| 2020/0296758 A1* | 9/2020 | Li | H04L 5/001 |
| 2022/0007370 A1* | 1/2022 | Li | H04W 72/044 |
| 2022/0007403 A1* | 1/2022 | Li | H04L 1/08 |

FOREIGN PATENT DOCUMENTS

| | | | |
|---|---|---|---|
| CN | 104135355 A | 11/2014 | |
| WO | 2016123393 A1 | 8/2016 | |
| WO | 2016163503 A1 | 10/2016 | |
| WO | 2019050379 A1 | 3/2019 | |
| WO | 2024053677 A1 | 1/2020 | |
| WO | 2020048481 A1 | 3/2020 | |
| WO | 20210186700 A1 | 9/2021 | |

OTHER PUBLICATIONS

Samsung, "Corrections on Bandwidth Part Operation", 3GPP Draft, R1-1800460, Jan. 2018, 3 pages.
Notice of Reasons for Refusal issued in related Japanese Application No. 2022-552266, mailed Sep. 12, 2023, 8 pages.
Examination Report issued in related Indian Application No. 202227063954, mailed Oct. 3, 2023, 7 pages.
International Search Report issued in corresponding International Application No. PCT/CN2021/086793, mailed Jun. 22, 2021, 4 pages.
Notice of Reason for Refusal issued in related Japanese Application No. 2024053677, mailed Jan. 7, 2025, 7 pages.
Office Action issued in related Korean Application No. 10-2022-7030119, mailed Jan. 22, 2025, 12 pages.
Huawei, R1-1911272, summary of 7.2.6.1 PDCCH enhancements, 3GPP TSG RAN WG1 #98bis, 3GPP, Oct. 2019, 59 pages.
Samsung, R1-1800460, corrections on Bandwidth Part Operation, 3GPP TSG RAN WG1 #AH, 3GPP server, Jan. 2018, 3 pages.

* cited by examiner

RESOURCE DETERMINING METHOD, RESOURCE INDICATION METHOD, AND DEVICE

CROSS-REFERENCE TO RELATED APPLICATIONS

This application is a continuation of International Application No. PCT/CN2021/086793, filed Apr. 13, 2021, which claims priority to Chinese Patent Application No. 202010287726.3, filed Apr. 13, 2020. The entire contents of each of the above-referenced applications are expressly incorporated herein by reference.

TECHNICAL FIELD

The present disclosure relates to the field of communication technologies, and in particular, to a resource determination method, a resource indication method, and a device.

BACKGROUND

With the development of technologies, the New Radio (NR) system has gradually become the mainstream direction in the communication field due to the characteristics of ultra-low latency and high reliability.

However, the current NR system is limited to scheduling one carrier with one piece of Downlink Control Information (DCI). For special scenarios, such as Dynamic Spectrum Sharing (DSS) scenarios, scheduling requires a large amount of Physical Downlink Control Channel (PDCCH) overheads.

SUMMARY

Embodiments of the present disclosure provide a resource determining method, a resource indication method, and a device.

In a first aspect, an embodiment of the present disclosure provides a resource determining method, performed by a user side device, including:

obtaining time domain resource indication information of downlink control information DCI, where the time domain resource indication information supports scheduling of multiple carriers or Bandwidth Part (BWP); and determining a scheduling time domain resource on the multiple carriers or BWPs according to the time domain resource indication information.

In a second aspect, an embodiment of the present disclosure further provides a resource indication method, performed by a network side device, including:

generating downlink control information DCI carrying time domain resource indication information, where the time domain resource indication information supports scheduling of multiple carriers or bandwidth parts BWPs; and sending the DCI to a user side device.

In a third aspect, an embodiment of the present disclosure further provides a user side device, including:

an obtaining module, configured to obtain time domain resource indication information of downlink control information DCI, where the time domain resource indication information supports scheduling of multiple carriers or bandwidth parts BWPs; and a determining module, configured to determine a scheduling time domain resource on the multiple carriers or BWPs according to the time domain resource indication information.

In a fourth aspect, an embodiment of the present disclosure further provides a network side device, including:

a generating module, configured to generate downlink control information DCI carrying time domain resource indication information, where the time domain resource indication information supports scheduling of multiple carriers or bandwidth parts BWPs; and a sending module, configured to send the DCI to a user side device.

In a fifth aspect, an embodiment of the present disclosure further provides a communication device, including a processor, a memory, and a computer program that is stored in the memory and that can be run on the processor, and when the computer program is executed by the processor, the steps of the foregoing resource determining method or resource indication method are implemented.

In a sixth aspect, an embodiment of the present disclosure further provides a computer-readable storage medium, where the computer-readable storage medium stores a computer program, and when the computer program is executed by a processor, the steps of the foregoing resource determining method or resource indication method are implemented.

In a seventh aspect, an embodiment of the present disclosure further provides a computer program product, stored in a nonvolatile storage medium. The program product is configured to be executed by at least one processor to implement the steps of the foregoing resource determining method or resource indication method.

In this way, in this embodiment of the present disclosure, after the time domain resource indication information of the DCI is obtained, since the time domain resource indication information supports the scheduling of multiple carriers or BWPs, the scheduling time domain resource on the multiple carriers or BWPs can be determined. In this way, multiple carriers or BWPs can be scheduled by one piece of DCI, and the PDCCH overheads in the scheduling process can be effectively reduced.

DETAILED DESCRIPTION

The following describes the present disclosure in detail with reference to the accompanying drawings and specific embodiments.

The method of the embodiments of the present disclosure is performed by a user side device, and the user equipment (UE) may refer to an access terminal, a subscriber unit, a subscriber station, a mobile site, a mobile station, a remote station, a remote terminal, a mobile device, a user terminal, a terminal, a wireless communications device, a user agent or a user apparatus. The terminal device may be a cellular phone, a cordless phone, a session initiation protocol (SIP) phone, a wireless local loop (WLL) station, a personal digital assistant (PDA), a hand-held device having a wireless communication function, a computing device or another processing device connected to a wireless modem, an on-board device, and a wearable device.

It should be known that, for ease of description, in this embodiment of the present disclosure, multiple carriers or BWPs refer to multiple carriers or multiple BWPs; each carrier or BWP refers to each carrier or each BWP; multiple carrier groups or BWP groups refer to multiple carrier groups or multiple BWP groups; and a single carrier or BWP refers to a single carrier or a single BWP.

Figures 1, 2:
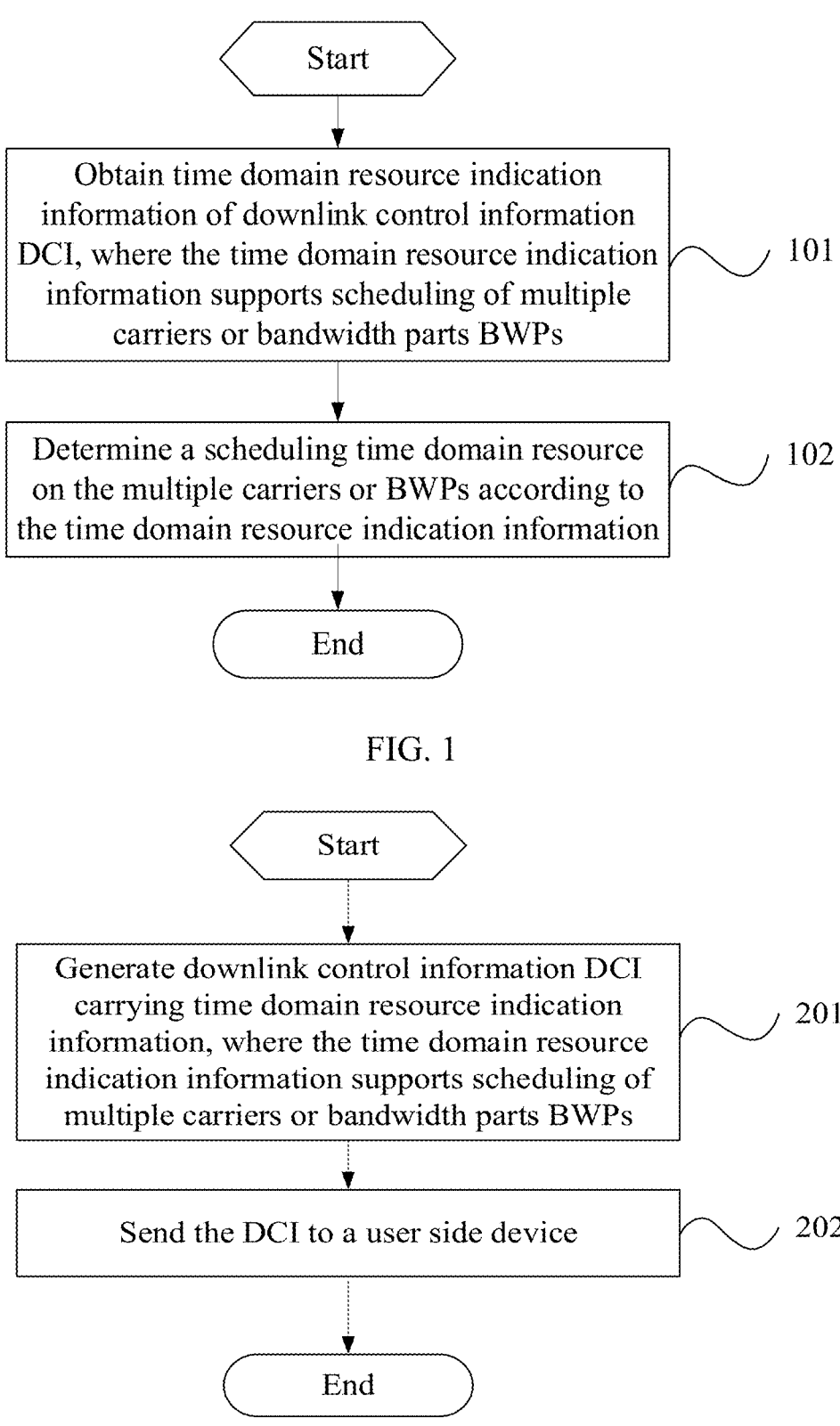
FIG. 1 is a flowchart of steps of a resource determining method according to an embodiment of the present disclosure.
FIG. 2 is a flowchart of steps of a resource indication method according to an embodiment of the present disclosure.

As shown in FIG. 1, a resource determining method according to an embodiment of the present disclosure is performed by a user side device, and includes:

Step 101: Obtain time domain resource indication information of downlink control information DCI, where the time domain resource indication information supports scheduling of multiple carriers or bandwidth parts BWPs.

In this step, the time domain resource indication information of the DCI supports scheduling of multiple carriers or BWPs, and can schedule a single carrier or BWP. Therefore, through this step, the time domain resource indication information of the DCI is obtained, and scheduling of the network side device is learned, so that the next step is performed.

Step 102: Determine a scheduling time domain resource on the multiple carriers or BWPs according to the time domain resource indication information.

In this step, after the time domain resource indication information that supports scheduling of multiple carriers or BWPs is obtained in step 101, according to the time domain resource indication information, the scheduling time domain resource on the multiple carriers or BWPs corresponding to the time domain resource indication information is determined.

Therefore, according to step 101 and step 102, after the time domain resource indication information of the DCI is obtained, since the time domain resource indication information supports scheduling of multiple carriers or BWPs, the user side device using the method of this embodiment of the present disclosure can determine the scheduling time domain resource on the multiple carriers or BWPs. In this way, multiple carriers or BWPs can be scheduled by one piece of DCI, and the PDCCH overheads in the scheduling process can be effectively reduced.

For example, in a DSS scenario, the network side device generates and sends DCI carrying time domain resource indication information. Since the time domain resource indication information supports scheduling of multiple carriers or BWPs, the user side device can obtain the time domain resource indication information after receiving the DCI, thereby determining the scheduling time domain resource on multiple carriers or BWPs.

It should be known that the information carried by the DCI is implemented through a corresponding field. Therefore, in this embodiment, step 101 includes:

determining, according to configuration information of a candidate resource scheduled by the DCI, a first indicator field corresponding to the time domain resource indication information in the DCI; and obtaining the time domain resource indication information according to the first indicator field.

Herein, the configuration information of the candidate resource scheduled by the DCI can be obtained through configuration (such as configuration through high-layer signaling) or pre-defined, and the user side device first determines, according to the configuration information, the first indicator field corresponding to the time domain resource indication information in the DCI, and then obtains the time domain resource indication information from the first indicator field.

In some embodiments, in the first indicator field, subfields corresponding to carriers or BWPs are arranged in an order of first identifiers; or high or low bits are allocated to subfields corresponding to carriers or BWPs based on respective time domain resource indications.

The first identifier may be a cell identity identifier (ID), or a Carrier Indicator Field (GIF), or a BWP ID. When subfields are sorted according to the order of the first identifiers, subfields are sorted in a descending order or an ascending order of the first identifiers. At this time, in the first indicator field, the sizes of the subfields corresponding to carriers or BWPs may be the same or may be different. In addition, in the first indicator field, the subfields corresponding to carriers or BWPs may be allocated with preset positions for respective time domain resource indications, in some embodiments, high bits or low bits. For example, DCI schedules cell 1, and in the first indicator field, the subfield corresponding to cell 1 is allocated with high bits to the time domain resource indication of the cell 1. Assuming that the subfield corresponding to cell 1 in the first indicator field is 5 bits and the time domain resource indication of the cell 1 only needs 2 bits, high 2 bits in the 5-bit subfield corresponding to cell 1 in the first indicator field are used to indicate the time domain resource of the cell 1.

In this embodiment, the determining, according to configuration information of a candidate resource scheduled by the DCI, a first indicator field corresponding to the time domain resource indication information in the DCI includes:

obtaining, according to configuration information of each carrier or BWP in the candidate resource, a size of a second indicator field corresponding to each carrier or BWP; and determining a size of the first indicator field according to the size of the second indicator field.

In some embodiments, the determining the size of the first indicator field according to the second indicator field includes:

using a sum of sizes of all second indicator fields as the size of the first indicator field; or using a size of the largest second indicator field among all second indicator fields as the size of the first indicator field.

In this way, after obtaining, according to the configuration information of each carrier or BWP in the candidate resource, the size of the second indicator field corresponding to each carrier or BWP, the sum of the sizes of all the second indicator fields can be used as the size of the first indicator field, that is, fields related to the time domain resource allocation of carriers or BWPs scheduled by DCI are independent. In this case, the subfields corresponding to carriers or BWPs in the first indicator field are arranged in the order of the first identifiers. A cell ID is used as an example. It is assumed that the DCI can schedule Cell 1 and Cell 2. It is obtained that a size of a field, that is, the second indicator field, related to the time domain resource allocation corresponding to Cell 1 is $S_1$ according to the configuration on Cell 1 and Cell 2, and the size of the second indicator field corresponding to Cell 2 is $S_2$. In this case, the size of the first indicator field in the DCI is $S_1+S_2$. In the first indicator field, the first $S_1$ bits are the subfield (a field related to time domain allocation) corresponding to Cell 1, and the last $S_2$ bits are the subfield corresponding to Cell 2.

In addition, the size of the largest second indicator field among all the second indicator fields can also be used as the size of the first indicator field, that is, a field related to the time domain resource allocation of carriers or BWPs scheduled by the DCI is shared among carriers or BWPs. In this case, the subfields corresponding to carriers or BWPs in the first indicator field are allocated with high or low bits for respective time domain resource indications. A cell ID is used as an example. It is assumed that the DCI can schedule Cell 1 and Cell 2. It is obtained that the size of the second indicator field corresponding to Cell 1 is $S_1$ according to the configuration on Cell 1 and Cell 2, and the second indicator field corresponding to Cell 2 is $S_2$. In this case, the size of the first indicator field in the DCI is $\max(S_1, S_2)$. In the first indicator field, the subfield corresponding to Cell 1 is allocated with high (or low) $S_1$ bits for time domain resource indication, and the subfield corresponding to Cell 2 is allocated with a related field of high (or low) $S_2$ bits for time domain resource indication. Therefore, assuming that $S_1 > S_2$, the subfield corresponding to Cell 1 is allocated with high $S_1$ bits for time domain resource indication, and the subfield corresponding to Cell 2 is allocated with a related field of low $S_2$ bits for time domain resource indication. When DCI schedules Cell 1, the size of the first indicator field of the DCI is $S_1$ bits, and the high $S_1$ bits of the first indicator field is the time domain resource indication of Cell 1. When DCI schedules Cell 2, the size of the first indicator field of DCI is $S_1$ bits, and the low $S_2$ bits of the $S_1$ bits are the time domain resource indication of Cell 2. In some embodiments, the subfields corresponding to carriers or BWPs in the first indicator field may all be allocated with high bits or low bits for respective time domain resource indications.

In addition, considering that the candidate resource includes multiple carrier groups or BWP groups, for the multiple carrier groups or BWP groups, in some embodiments, the determining, according to configuration information of a candidate resource scheduled by the DCI, a first indicator field corresponding to the time domain resource indication information in the DCI includes:

in a case that the candidate resource includes multiple carrier groups or BWP groups, obtaining, according to configuration information of the multiple carrier groups or BWP groups, a size of a third indicator field corresponding to each carrier group or BWP group; and determining a size of the first indicator field according to the size of the third indicator field.

In some embodiments, the determining the size of the first indicator field according to the size of the third indicator field includes:

using a size of the largest third indicator field among all third indicator fields as the size of the first indicator field; or obtaining the size L of the first indicator field according to a formula $L=S_{MAX}*N$, where $S_{MAX}$ is a size of the largest single carrier or BWP indicator field in the multiple carrier groups or BWP groups, and N is the maximum number of carriers or BWPs of the multiple carrier groups or BWP groups in the candidate resource; or using a size of the largest single carrier or BWP indicator field in the multiple carrier groups or BWP groups as the size of the first indicator field.

In this way, after obtaining, according to the configuration information of multiple carrier groups or BWP groups, the size of the third indicator field corresponding to each carrier group or BWP group, the size of the largest third indicator field among all the third indicator fields can be used as the size of the first indicator field. When DCI of the same size can schedule multiple carrier groups or BWP groups, the subfields corresponding to carriers or BWPs in the first indicator field can be arranged in the order of the first identifiers. If the first indicator field has remaining bits after the arrangement, the remaining bits are invalid bits and can be set to all zeros. Alternatively, in the first indicator field, subfields corresponding to carriers or BWPs are allocated with high or low bits for respective time domain resource indications.

For example, DCI can schedule carrier group 1 (including Cell 1 and Cell 2) and carrier group 2 (including Cell 3 and Cell 4). It is obtained that the size of the third indicator field corresponding to carrier group 1 is 5 bits (Cell 1 is 2 bits and Cell 2 is 3 bits) based on the respective configuration information of the two carrier groups. The size of the third indicator field corresponding to carrier group 2 is 10 bits (Cell 3 is 4 bits and Cell 4 is 6 bits). In this case, the size of the first indicator field is 10 bits. Therefore, if the subfields corresponding to carriers or BWPs in the first indicator field are arranged in the order of the first identifiers, for carrier group 1, the first 2 bits of the first indicator field are the subfield corresponding to Cell 1, and the last 3 bits are the subfield corresponding to Cell 2. For carrier group 2, the first 4 bits of the first indicator field are the subfield corresponding to Cell 3, and the last 6 bits are the subfield corresponding to Cell 4. In this way, when DCI schedules Cell 1 and Cell 2, in the 10 bits of the first indicator field of DCI, the first 2 bits are the subfield corresponding to Cell 1 (used for scheduling of Cell 1), the next 3 bits are the subfield corresponding to Cell 2, and the last 5 bits can be set to all zeros.

In addition, the size of the largest single carrier or BWP indicator field in the multiple carrier groups or BWP groups may also be used as the size of the first indicator field. A size of a field (that is, the single carrier or BWP indicator field) related to time domain resource allocation required by each carrier or BWP of multiple carrier groups or BWP groups that can be scheduled by DCI is $S_1, S_2, \ldots, S_K$, where K is the total number of all carriers or BWPs in multiple carrier groups or BWP groups that can be scheduled by DCI. In this case, the size of the first indicator field is $S_{max}$, $S_{max}=\max(S_1, S_2, \ldots, S_K)$. When DCI of the same size can schedule multiple carrier groups or BWP groups, in some embodiments, in the first indicator field, subfields corresponding to carriers or BWPs are allocated with high or low bits for respective time domain resource indications. For example, DCI can schedule carrier group 1 (including Cell 1 and Cell 2) and carrier group 2 (including Cell 3 and Cell 4). It is obtained that Cell 1 is 2 bits, Cell 2 is 3 bits, Cell 3 is 4 bits, and Cell 4 is 6 bits according to the configuration information of each carrier or BWP. In this case, the size of the first indicator field is 6 bits. Assuming that the subfields corresponding to carriers or BWPs in the first indicator field are all allocated with high bits for respective time domain resource indication, when DCI schedules Cell 1 and Cell 2, among the 6 bits of the first indicator field of DCI, the first 2 bits are the subfield corresponding to Cell 1, the next 3 bits are the subfield corresponding to Cell 2, and the last 1 bit is an invalid bit and can be set to zero.

Alternatively, the size L of the first indicator field is obtained according to the formula $L=S_{MAX}*N$, where N is the maximum number of carriers or BWPs of multiple carrier groups or BWP groups in the candidate resource. When DCI of the same size can schedule multiple carrier groups or BWP groups, the subfields corresponding to carriers or BWPs in the first indicator field can be arranged in the order of the first identifiers. The sizes of the subfields corresponding to carriers or BWPs all can be $S_{MAX}$ bits, and high $S_1$ bits or low $S_1$ bits of each $S_{MAX}$ bits correspond to the $i^{th}$ carrier or BWP. In addition, sizes of the subfields corresponding to carriers or BWPs in the first indicator field may also be different, and sizes of the subfields corresponding to carriers or BWPs are equal to the sizes of respective time domain resource indications.

For example, DCI can schedule carrier group 1 (including Cell 1 and Cell 2) and carrier group 2 (including Cell 3 and Cell 4). It is obtained that Cell 1 is 2 bits, Cell 2 is 3 bits, Cell 3 is 4 bits, and Cell 4 is 6 bits according to the configuration information of each carrier or BWP. In this case, the size of the first indicator field is 10*2 bit=20 bits. The subfields corresponding to carriers or BWPs in the first indicator field are arranged in the order of the first identifiers. When the DCI schedules Cell 1 and Cell 2, on the one hand, in the 20 bits of the first indicator field of the DCI, the first 10 bits are the subfield corresponding to Cell 1, and the last 10 bits are the subfield corresponding to Cell 2. Besides, only high 2 bits or low 2 bits in the first 10 bits are used for the time domain resource indication of Cell 2, and only high 3 bits or low 3 bits in the last 10 bits are used for the time domain resource indication of Cell 2. On the other hand, in the 20 bits of the first indicator field of the DCI, continuous bits can be used for the time domain resource indication of the cell, and the subfield corresponding to each cell directly indicates a time domain resource of the cell. The first 2 bits of the 20 bits are the subfield corresponding to Cell 1 and directly indicates the time domain resource of Cell 1, and the next 3 bits are the subfield corresponding to Cell 2 and indicates the time domain resource of Cell 2. In this case, the last 15 bits are invalid bits and can be set to all zeros.

In this embodiment, the determining, according to configuration information of a candidate resource scheduled by the DCI, a first indicator field corresponding to the time domain resource indication information in the DCI includes:

obtaining the size of the first indicator field according to configuration information of a reference carrier or BWP in the candidate resource.

Herein, a reference carrier or BWP is set in a configuration or pre-defined manner, and the size of the first indicator field is obtained based on the configuration information of the reference carrier or BWP. The reference carrier or BWP may be a secondary cell Pcell, a cell or BWP with the smallest or largest cell ID, and a cell or BWP with the smallest or largest Subcarrier Spacing (SCS).

In this embodiment, the determining, according to configuration information of a candidate resource scheduled by the DCI, a first indicator field corresponding to the time domain resource indication information in the DCI includes:

selecting the size of the first indicator field based on a preset strategy according to whether the DCI schedules a single carrier or a BWP.

The preset strategy includes:

obtaining, if the DCI schedules a single carrier or BWP, the size of the first indicator field according to configuration information of the scheduled carrier or BWP; and if the DCI does not schedule a single carrier or BWP, obtaining a size of a fourth indicator field corresponding to each carrier group or BWP group according to the configuration information of the multiple carrier groups or BWP groups in the candidate resource, and using a size of the largest fourth indicator field among all fourth indicator fields as the size of the first indicator field, or using a size of the largest single carrier or single BWP indicator field in the multiple carrier groups or BWP groups as the size of the first indicator field, or obtaining the size L' of the first indicator field according to a formula $L'=S'_{MAX}*N$, where $S'_{MAX}$ is a size of the largest single carrier or BWP indicator field in the multiple carrier groups or BWP groups, and N is the maximum number of carriers or BWPs of the multiple carrier groups or BWP groups in the candidate resource; or obtaining the size of the first indicator field according to configuration information of a reference carrier or BWP in the candidate resource.

In this way, when the DCI schedules a single carrier or BWP, the size of the first indicator field is obtained based on the configuration information of the scheduled carrier or BWP. For example, the size of the first indicator field is equal to the size $S_{single}$ of the scheduled carrier or BWP indicator field obtained based on the configuration information. If the DCI does not schedule a single carrier or BWP, after obtaining a size of a fourth indicator field corresponding to each carrier group or BWP group according to the configuration information of the multiple carrier groups or BWP groups in the candidate resource, a size of the largest fourth indicator field among all fourth indicator fields may be used as the size of the first indicator field, or a size of the largest single carrier or single BWP indicator field in the multiple carrier groups or BWP groups may be used as the size of the first indicator field, or the size L' of the first indicator field is obtained according to a formula $L'=S'_{MAX}*N$; or the size of the first indicator field is obtained according to configuration information of a reference carrier or BWP in the candidate resource.

Herein, an implementation of determining the first indicator field when the DCI does not schedule a single carrier or BWP is similar to the above implementation of determining the size of the first indicator field according to the size of the third indicator field, and details are not repeated herein. The reference carrier or BWP is described above.

In this embodiment, step 102 includes:

if the DCI schedules a reference carrier or BWP, the scheduling time domain resource is a time domain resource indicated by the time domain resource indication information; and if the DCI schedules a non-reference carrier or BWP, determining the scheduling time domain resource according to a time domain position of scheduling the reference carrier or BWP.

Herein, a reference carrier or BWP is set in a configuration or pre-defined manner, and the size of the first indicator field is obtained based on the configuration information of the reference carrier or BWP. The reference carrier or BWP may be a secondary cell Pcell, a cell or BWP with the smallest or largest cell ID, and a cell or BWP with the smallest or largest subcarrier spacing SCS. If the DCI schedules a reference carrier or BWP, the scheduling time domain resource is a time domain resource indicated by the time domain resource indication information. If the DCI schedules a non-reference carrier or BWP, the scheduling time domain resource is further determined according to the time domain position of scheduling the reference carrier or BWP, such as the first slot or the last slot overlapping the time domain position of scheduling the reference carrier or BWP, or all slots. A time position of scheduling a Physical Downlink Shared Channel (PDSCH) or a Physical Uplink Shared Channel (PUSCH) is a symbol position of a Start and length indicator value (SLIV) corresponding to a determined slot or multiple slots. In this way, overheads are reduced, and the lengths and locations of time domain resources allocated for cells are consistent.

In this embodiment, the time domain resource indication information includes: a second identifier, where the second identifier is an indication identifier of a time domain resource.

In this way, when the time domain resource indication information of DCI is shared among carriers or BWPs, multiple time domain resource identifiers can be configured, and time domain resource indication can be achieved through specific identifiers and/or offset values.

For example, a second identifier combination of the time domain resource indication information of multiple cells may be configured: if the multiple cells are Cell 1 and Cell 2, assuming that Cell 1 and Cell 2 are respectively configured with 8 time domain resource allocation values, the correspondence between the second identifier and an indication index identifier of the time domain resource allocation value of Cell 1, that is, the Cell 1 time domain resource allocation (TDRA) index, and an indication index identifier of the time domain resource allocation value of Cell 2, that is, Cell 2 TDRA index is shown in Table 1.

TABLE 1

| Second identifier | Cell 1 TDRA index | Cell 2 TDRA index |
|---|---|---|
| 0 | 1 | 2 |
| 1 | 2 | 3 |
| 2 | 3 | 4 |
| 3 | 4 | 5 |
| 4 | 5 | 6 |
| 5 | 6 | 7 |
| 6 | 7 | 0 |
| 7 | 0 | 1 |

Another configuration method is that a new TDRA table (different from the TDRA table for individually scheduling) can be configured for the carrier group or the carriers or BWPs included in the BWP group, and combined into a new joint TDRA table.

In some embodiments, the indication part of the specific time domain resource allocation in the joint TDRA table may be shared among multiple carriers or BWPs, for example, the joint TDRA table configures K0/K2 of cell 1, K0/K2 of cell 2, and a shared SLIV In this embodiment, the time domain resource indication information includes: first indication information and second indication information;

where the first indication information is a shared indication of the carriers or BWPs, and the second indication information is independent indications of carriers or BWPs.

In some embodiments, the first indication information is a slot indication, and the second indication information is a symbol indication in a slot; or the first indication information is a symbol indication in a slot, and the second indication information is a slot indication.

In this way, the flexibility of some time domain resource indication information indications can be enhanced, and this is applicable in a Time Division Duplex (TDD) scenario when Uplink (UL) and Downlink (DL) are configured with different cells.

Assuming that there are two cells: cell 1 and cell 2, the slot indication (K0/K2) indicates independently for carriers or BWPs, and the symbol indication SLIV in the slot indicates in a shared manner for carriers or BWPs. In a field of the time domain resource indication information, the first $S_1$ bits indicate the K0/K2 value of cell 1, then the $S_2$ bits indicate the K0/K2 value of cell 2, and the last $S_3$ bits indicate SLIV values of cell 1 and cell 2.

In addition, in this embodiment, after step 102, the method further includes:

if the scheduling time domain resource conflicts with an uplink and downlink configuration of a corresponding carrier or BWP, determining that the scheduling time domain resource is invalid.

In this way, when TDD uplink and downlink configurations configured for the carrier group or the BWP group scheduled by DCI are different, and when the time domain resources scheduled by DCI are inconsistent with the uplink and downlink configurations on one or more carriers, the scheduling resource is regarded as invalid. For example, if DCI schedules uplink transmission, and the symbol configuration of the resource part represented by TDRA indicated on carrier 2 is a downlink symbol, the UE considers the scheduling to be invalid and does not send any data. At this time, the resources represented by the TDRA indicated on carrier 1 do not conflict, the uplink PUSCH scheduling is valid, and the UE sends data.

In conclusion, after the time domain resource indication information of the DCI is obtained, since the time domain resource indication information supports scheduling of multiple carriers or BWPs, the scheduling time domain resource on the multiple carriers or BWPs can be determined. In this way, multiple carriers or BWPs can be scheduled by one piece of DCI, and the PDCCH overheads in the scheduling process can be effectively reduced.

As shown in FIG. 2, an embodiment of the present disclosure further provides a resource indication method, performed by a network side device, including:

Step 201: Generate downlink control information DCI carrying time domain resource indication information, where the time domain resource indication information supports scheduling of multiple carriers or bandwidth parts BWPs.

Step 202: Send the DCI to a user side device.

According to step 201 and step 202, the network side device using the method of the embodiment of the present disclosure generates DCI carrying time domain resource indication information. Since the time domain resource indication information supports scheduling of multiple carriers or BWPs, the DCI is sent to the user side device, so that the user side device can determine the scheduling time domain resource on multiple carriers or BWPs. In this way, multiple carriers or BWPs can be scheduled by one piece of DCI, and the PDCCH overheads in the scheduling process can be effectively reduced.

In some embodiments, step 201 includes:

determining, according to configuration information of a candidate resource scheduled by the DCI, a first indicator field corresponding to the time domain resource indication information in the DCI; and obtaining, according to the first indicator field, DCI carrying the time domain resource indication information.

In some embodiments, the determining, according to configuration information of a candidate resource scheduled by the DCI, a first indicator field corresponding to the time domain resource indication information in the DCI includes:

obtaining, according to configuration information of each carrier or BWP in the candidate resource, a size of a second indicator field corresponding to each carrier or BWP; and determining a size of the first indicator field according to the size of the second indicator field.

In some embodiments, the determining the size of the first indicator field according to the second indicator field includes:

using a sum of sizes of all second indicator fields as the size of the first indicator field; or using a size of the largest second indicator field among all second indicator fields as the size of the first indicator field.

In some embodiments, the determining, according to configuration information of a candidate resource scheduled by the DCI, a first indicator field corresponding to the time domain resource indication information in the DCI includes:

in a case that the candidate resource includes multiple carrier groups or BWP groups, obtaining, according to configuration information of the multiple carrier groups or BWP groups, a size of a third indicator field corresponding to each carrier group or BWP group; and determining a size of the first indicator field according to the size of the third indicator field.

In some embodiments, the determining the size of the first indicator field according to the size of the third indicator field includes:

using a size of the largest third indicator field among all third indicator fields as the size of the first indicator field; or obtaining the size L of the first indicator field according to a formula $L=S_{MAX}*N$, where $S_{MAX}$ is a size of the largest single carrier or BWP indicator field in the multiple carrier groups or BWP groups, and N is the maximum number of carriers or BWPs of the multiple carrier groups or BWP groups in the candidate resource; or using a size of the largest single carrier or BWP indicator field in the multiple carrier groups or BWP groups as the size of the first indicator field.

In some embodiments, the determining, according to configuration information of a candidate resource scheduled by the DCI, a first indicator field corresponding to the time domain resource indication information in the DCI includes:

selecting the size of the first indicator field based on a preset strategy according to whether the DCI schedules a single carrier or a BWP.

In some embodiments, the preset strategy includes:

obtaining, if the DCI schedules a single carrier or BWP, the size of the first indicator field according to configuration information of the scheduled carrier or BWP; and if the DCI does not schedule a single carrier or BWP, obtaining a size of a fourth indicator field corresponding to each carrier group or BWP group according to the configuration information of the multiple carrier groups or BWP groups in the candidate resource, and using a size of the largest fourth indicator field among all fourth indicator fields as the size of the first indicator field, or using a size of the largest single carrier or single BWP indicator field in the multiple carrier groups or BWP groups as the size of the first indicator field, or obtaining the size L' of the first indicator field according to a formula $L'=S'_{MAX}*N$, where $S'_{MAX}$ is a size of the largest single carrier or BWP indicator field in the multiple carrier groups or BWP groups, and N is the maximum number of carriers or BWPs of the multiple carrier groups or BWP groups in the candidate resource; or obtaining the size of the first indicator field according to configuration information of a reference carrier or BWP in the candidate resource.

In some embodiments, the determining, according to configuration information of a candidate resource scheduled by the DCI, a first indicator field corresponding to the time domain resource indication information in the DCI includes:

obtaining the size of the first indicator field according to configuration information of a reference carrier or BWP in the candidate resource.

In some embodiments, the determining a scheduling time domain resource on the multiple carriers or BWPs according to the time domain resource indication information includes:

if the DCI schedules a reference carrier or BWP, the scheduling time domain resource is a time domain resource indicated by the time domain resource indication information; and if the DCI schedules a non-reference carrier or BWP, determining the scheduling time domain resource according to a time domain position of scheduling the reference carrier or BWP.

In some embodiments, in the first indicator field, subfields corresponding to carriers or BWPs are arranged in an order of first identifiers; or subfields corresponding to carriers or BWPs are allocated with high or low bits for respective time domain resource indications.

In some embodiments, the time domain resource indication information includes:

a second identifier, where the second identifier is an indication identifier of a time domain resource.

In some embodiments, the time domain resource indication information includes: first indication information and second indication information;

where the first indication information is a shared indication of the carriers or BWPs, and the second indication information is independent indications of carriers or BWPs.

In some embodiments, the first indication information is a slot indication, and the second indication information is a symbol indication in a slot; or the first indication information is a symbol indication in a slot, and the second indication information is a slot indication.

In some embodiments, after the determining a scheduling time domain resource on the multiple carriers or BWPs according to the time domain resource indication information, the method further includes:

if the scheduling time domain resource conflicts with an uplink and downlink configuration of a corresponding carrier or BWP, determining that the scheduling time domain resource is invalid.

It should be noted that the resource indication method is implemented in cooperation with the above-mentioned resource determining method, and the implementation manner of the embodiments of the above-mentioned resource determining method is applicable to this method, and the same technical effect can also be achieved.

Figure 3:
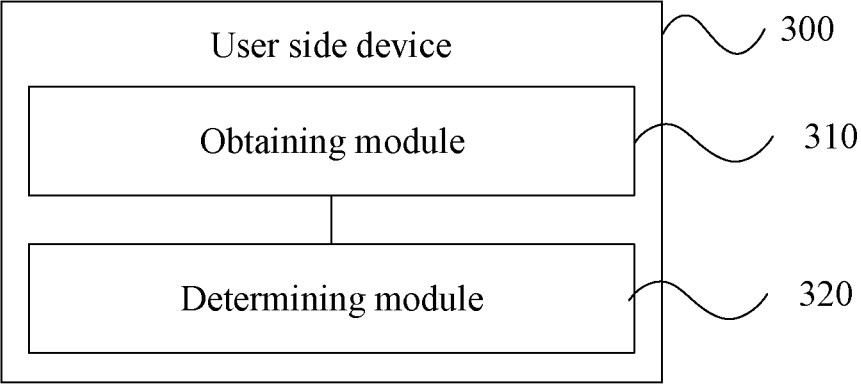
FIG. 3 is a schematic structural diagram of a user side device according to an embodiment of the present disclosure.

FIG. 3 is a block diagram of a user side device according to an embodiment of the present disclosure. The user side device 300 shown in FIG. 3 includes an obtaining module 310 and a determining module 320.

The obtaining module 310 is configured to obtain time domain resource indication information of downlink control information DCI, where the time domain resource indication information supports scheduling of multiple carriers or bandwidth parts BWPs; and the determining module 320 is configured to determine a scheduling time domain resource on the multiple carriers or BWPs according to the time domain resource indication information.

In some embodiments, the obtaining module 310 includes:

a first processing submodule, configured to determine, according to configuration information of a candidate resource scheduled by the DCI, a first indicator field corresponding to the time domain resource indication information in the DCI; and a second processing submodule, configured to obtain the time domain resource indication information according to the first indicator field.

In some embodiments, the first processing submodule includes:

a first processing unit, configured to obtain, according to configuration information of each carrier or BWP in the candidate resource, a size of a second indicator field corresponding to each carrier or BWP; and a second processing unit, configured to determine a size of the first indicator field according to the size of the second indicator field.

In some embodiments, the second processing unit is further configured to: use a sum of sizes of all second indicator fields as the size of the first indicator field; or use a size of the largest second indicator field among all second indicator fields as the size of the first indicator field.

In some embodiments, the first processing submodule includes:

a third processing unit, configured to: in a case that the candidate resource includes multiple carrier groups or BWP groups, obtain, according to configuration information of the multiple carrier groups or BWP groups, a size of a third indicator field corresponding to each carrier group or BWP group; and a fourth processing unit, configured to determine a size of the first indicator field according to the size of the third indicator field.

In some embodiments, the fourth processing unit is further configured to:

use a size of the largest third indicator field among all third indicator fields as the size of the first indicator field; or obtain the size L of the first indicator field according to a formula $L=S_{MAX}*N$, where $S_{MAX}$ is a size of the largest single carrier or BWP indicator field in the multiple carrier groups or BWP groups, and N is the maximum number of carriers or BWPs of the multiple carrier groups or BWP groups in the candidate resource; or use a size of the largest single carrier or BWP indicator field in the multiple carrier groups or BWP groups as the size of the first indicator field.

In some embodiments, the first processing submodule includes:

a fifth processing unit, configured to select the size of the first indicator field based on a preset strategy according to whether the DCI schedules a single carrier or a BWP.

In some embodiments, the preset strategy includes:

obtaining, if the DCI schedules a single carrier or BWP, the size of the first indicator field according to configuration information of the scheduled carrier or BWP; and if the DCI does not schedule a single carrier or BWP, obtaining a size of a fourth indicator field corresponding to each carrier group or BWP group according to the configuration information of the multiple carrier groups or BWP groups in the candidate resource, and using a size of the largest fourth indicator field among all fourth indicator fields as the size of the first indicator field, or using a size of the largest single carrier or single BWP indicator field in the multiple carrier groups or BWP groups as the size of the first indicator field, or obtaining the size L' of the first indicator field according to a formula $L'=S_{MAX}*N$, where $S_{MAX}$ is a size of the largest single carrier or BWP indicator field in the multiple carrier groups or BWP groups, and N is the maximum number of carriers or BWPs of the multiple carrier groups or BWP groups in the candidate resource; or obtaining the size of the first indicator field according to configuration information of a reference carrier or BWP in the candidate resource.

In some embodiments, the first processing submodule is further configured to:

obtain the size of the first indicator field according to configuration information of a reference carrier or BWP in the candidate resource.

In some embodiments, the determining module is further configured to:

if the DCI schedules a reference carrier or BWP, determine that the scheduling time domain resource is a time domain resource indicated by the time domain resource indication information; and if the DCI schedules a non-reference carrier or BWP, determine the scheduling time domain resource according to a time domain position of scheduling the reference carrier or BWP.

In some embodiments, in the first indicator field, subfields corresponding to carriers or BWPs are arranged in an order of first identifiers; or subfields corresponding to carriers or BWPs are allocated with high or low bits for respective time domain resource indications.

In some embodiments, the time domain resource indication information includes:

a second identifier, where the second identifier is an indication identifier of a time domain resource.

In some embodiments, the time domain resource indication information includes: first indication information and second indication information;

where the first indication information is a shared indication of the carriers or BWPs, and the second indication information is independent indications of carriers or BWPs.

In some embodiments, the first indication information is a slot indication, and the second indication information is a symbol indication in a slot; or the first indication information is a symbol indication in a slot, and the second indication information is a slot indication.

In some embodiments, the user side device further includes:

a first conflict processing module, configured to: if the scheduling time domain resource conflicts with an uplink and downlink configuration of a corresponding carrier or BWP, determine that the scheduling time domain resource is invalid.

The user side device 300 can implement each process implemented by the user side device in the method embodiment of FIG. 1, which is not repeated here to avoid repetition. In this embodiment of the present disclosure, after the time domain resource indication information of the DCI is obtained, since the time domain resource indication information supports scheduling of multiple carriers or BWPs, the user side device can determine the scheduling time domain resource on the multiple carriers or BWPs. In this way, multiple carriers or BWPs can be scheduled by one piece of DCI, and the PDCCH overheads in the scheduling process can be effectively reduced.

Figure 4:
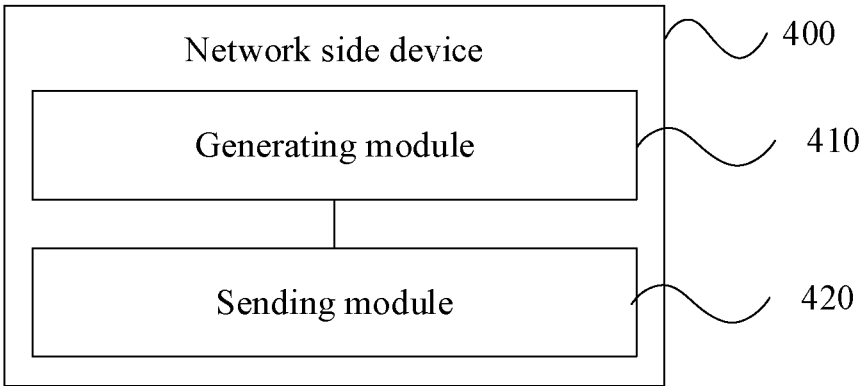
FIG. 4 is a schematic structural diagram of a network side device according to an embodiment of the present disclosure.

FIG. 4 is a block diagram of a network side device according to an embodiment of the present disclosure. The network side device 400 shown in FIG. 4 includes a generating module 410 and a sending module 420.

The generating module 410 is configured to generate downlink control information DCI carrying time domain resource indication information, where the time domain resource indication information supports scheduling of multiple carriers or bandwidth parts BWPs; and the sending module 420 is configured to send the DCI to a user side device.

In some embodiments, the generating module includes:
a third processing submodule, configured to determine, according to configuration information of a candidate resource scheduled by the DCI, a first indicator field corresponding to the time domain resource indication information in the DCI; and
a fourth processing submodule, configured to obtain, according to the first indicator field, DCI carrying the time domain resource indication information.

In some embodiments, the third processing submodule includes:
an eighth processing unit, configured to obtain, according to configuration information of each carrier or BWP in the candidate resource, a size of a second indicator field corresponding to each carrier or BWP; and
a ninth processing unit, configured to determine a size of the first indicator field according to the size of the second indicator field.

In some embodiments, the ninth processing unit is further configured to:
use a sum of sizes of all second indicator fields as the size of the first indicator field; or
use a size of the largest second indicator field among all second indicator fields as the size of the first indicator field.

In some embodiments, the third processing submodule includes:
a tenth processing unit, configured to: in a case that the candidate resource includes multiple carrier groups or BWP groups, obtain, according to configuration information of the multiple carrier groups or BWP groups, a size of a third indicator field corresponding to each carrier group or BWP group; and
an eleventh processing unit, configured to determine a size of the first indicator field according to the size of the third indicator field.

In some embodiments, the eleventh processing unit is further configured to:

use a size of the largest third indicator field among all third indicator fields as the size of the first indicator field; or
obtain the size L of the first indicator field according to a formula $L=S_{MAX}*N$, where $S_{MAX}$ is a size of the largest single carrier or BWP indicator field in the multiple carrier groups or BWP groups, and N is the maximum number of carriers or BWPs of the multiple carrier groups or BWP groups in the candidate resource; or
use a size of the largest single carrier or BWP indicator field in the multiple carrier groups or BWP groups as the size of the first indicator field.

In some embodiments, the third processing submodule includes:
a twelfth processing unit, configured to select the size of the first indicator field based on a preset strategy according to whether the DCI schedules a single carrier or a BWP.

In some embodiments, the preset strategy includes:
obtaining, if the DCI schedules a single carrier or BWP, the size of the first indicator field according to configuration information of the scheduled carrier or BWP; and
if the DCI does not schedule a single carrier or BWP, obtaining a size of a fourth indicator field corresponding to each carrier group or BWP group according to the configuration information of the multiple carrier groups or BWP groups in the candidate resource, and using a size of the largest fourth indicator field among all fourth indicator fields as the size of the first indicator field, or using a size of the largest single carrier or single BWP indicator field in the multiple carrier groups or BWP groups as the size of the first indicator field, or obtaining the size L' of the first indicator field according to a formula $L'=S'_{MAX}*N$, where $S'_{MAX}$ is a size of the largest single carrier or BWP indicator field in the multiple carrier groups or BWP groups, and N is the maximum number of carriers or BWPs of the multiple carrier groups or BWP groups in the candidate resource; or obtaining the size of the first indicator field according to configuration information of a reference carrier or BWP in the candidate resource.

In some embodiments, the third processing submodule is further configured to:
obtain the size of the first indicator field according to configuration information of a reference carrier or BWP in the candidate resource.

In some embodiments, the fourth processing submodule is further configured to:
if the DCI schedules a reference carrier or BWP, determine that the scheduling time domain resource is a time domain resource indicated by the time domain resource indication information; and
if the DCI schedules a non-reference carrier or BWP, determine the scheduling time domain resource according to a time domain position of scheduling the reference carrier or BWP.

In some embodiments, in the first indicator field, subfields corresponding to carriers or BWPs are arranged in an order of first identifiers; or subfields corresponding to carriers or BWPs are allocated with high or low bits for respective time domain resource indications.

In some embodiments, the time domain resource indication information includes:
a second identifier, where the second identifier is an indication identifier of a time domain resource.

In some embodiments, the time domain resource indication information includes: first indication information and second indication information;

where the first indication information is a shared indication of the carriers or BWPs, and the second indication information is independent indications of carriers or BWPs.

In some embodiments, the first indication information is a slot indication, and the second indication information is a symbol indication in a slot; or the first indication information is a symbol indication in a slot, and the second indication information is a slot indication.

In some embodiments, the device also includes:

a second conflict processing module, configured to: if the scheduling time domain resource conflicts with an uplink and downlink configuration of a corresponding carrier or BWP, determine that the scheduling time domain resource is invalid.

The network side device 400 can implement the processes implemented by the network side device in the method embodiment in FIG. 2. To avoid repetition, details are not described herein again. In this embodiment of the present disclosure, the network side device generates the DCI carrying the time domain resource indication information. Since the time domain resource indication information supports scheduling of multiple carriers or BWPs, the DCI is sent to the user side device, so that the user side device can determine the scheduled time domain resource on the multiple carriers or BWPs. Therefore, one piece of DCI can schedule multiple carriers or BWPs, to effectively reduce the PDCCH overheads in a scheduling process.

Figure 5:
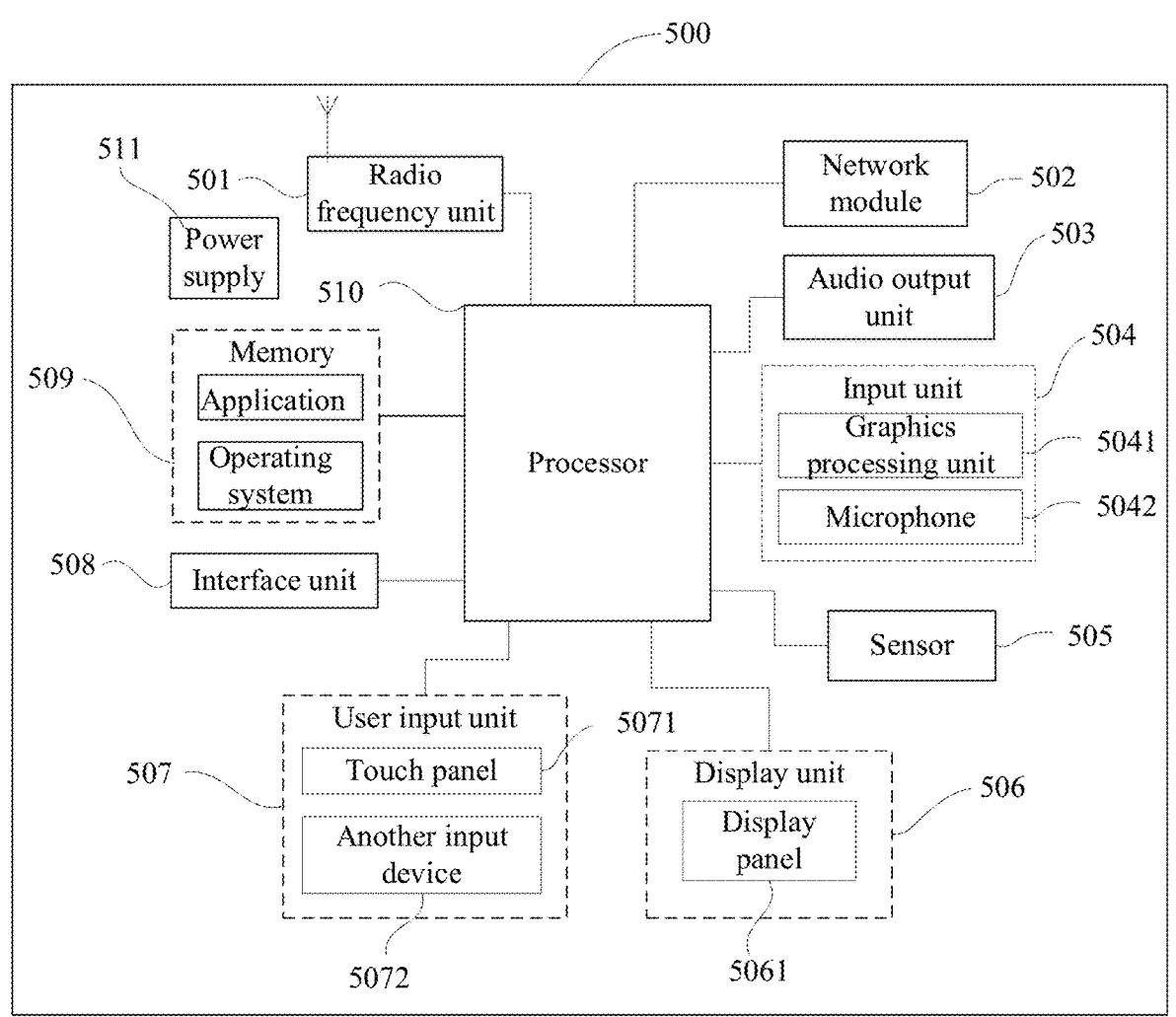
FIG. 5 is a schematic structural diagram of a user side device according to another embodiment of the present disclosure.

FIG. 5 is a schematic structural diagram of hardware of a network side device implementing the embodiments of the present disclosure. The network side device 500 includes but is not limited to: a radio frequency unit 501, a network module 502, an audio output unit 503, an input unit 504, a sensor 505, a display unit 506, a user input unit 507, an interface unit 508, a memory 509, a processor 510, a power supply 511, and other components. A person skilled in the art may understand that the structure of the network side device shown in FIG. 5 does not constitute a limitation to the network side device. The network side device may include more or fewer components than that shown in the figure, or a combination of some components, or an arrangement of different components. In this embodiment of the present disclosure, the network side device includes but is not limited to a mobile phone, a tablet computer, a laptop computer, a palmtop computer, an in-vehicle terminal, a wearable device, a pedometer, and the like.

The processor 510 is configured to obtain time domain resource indication information of downlink control information DCI, where the time domain resource indication information supports scheduling of multiple carriers or bandwidth parts BWPs; and determine a scheduling time domain resource on the multiple carriers or BWPs according to the time domain resource indication information.

As can be seen, after the time domain resource indication information of the DCI is obtained, since the time domain resource indication information supports scheduling of multiple carriers or BWPs, the user side device can determine the scheduling time domain resource on the multiple carriers or BWPs. In this way, multiple carriers or BWPs can be scheduled by one piece of DCI, and the PDCCH overheads in the scheduling process can be effectively reduced.

It should be understood that, in this embodiment of the present disclosure, the radio frequency unit 501 may be configured to receive and send information or a signal in a call process. In some embodiments, after receiving downlink data from a base station, the radio frequency unit sends the downlink data to the processor 510 for processing. In addition, the radio frequency unit sends uplink data to the base station. Usually, the radio frequency unit 501 includes but is not limited to an antenna, at least one amplifier, a transceiver, a coupler, a low noise amplifier, a duplexer, and the like. In addition, the radio frequency unit 501 may communicate with a network and another device through a wireless communication system.

The network side device provides a user with wireless broadband Internet access through the network module 502, for example, helps the user send and receive emails, browse web pages, and access streaming media.

The audio output unit 503 may convert audio data received by the radio frequency unit 501 or the network module 502 or stored in the memory 509 into an audio signal and output the audio signal as a sound. In addition, the audio output unit 503 may further provide an audio output (for example, call signal receiving sound or message receiving sound) related to a specific function performed by the network side device 500. The audio output unit 503 includes a speaker, a buzzer, a telephone receiver, and the like.

The input unit 504 is configured to receive an audio signal or a video signal. The input unit 504 may include a Graphics Processing Unit (GPU) 5041 and a microphone 5042. The graphics processing unit 5041 is used to process image data of a static picture or a video obtained by an image capturing device (for example, a camera) in a video capturing mode or an image capturing mode. A processed image frame may be displayed on the display unit 506. The image frame processed by the graphics processing unit 5041 may be stored in the memory 509 (or another storage medium) or sent by using the radio frequency unit 501 or the network module 502. The microphone 5042 may receive a sound and can process such sound into audio data. Processed audio data may be converted, in a call mode, into a format that can be sent to a mobile communication base station by using the radio frequency unit 501 for output.

The network side device 500 further includes at least one sensor 505, for example, a light sensor, a motor sensor, and another sensor. In some embodiments, the light sensor includes an ambient light sensor and a proximity sensor. The ambient light sensor may adjust luminance of the display panel 5061 based on brightness of ambient light. The proximity sensor may turn off the display panel 5061 and/or backlight when the network side device 500 moves to an ear. As a type of the motion sensor, an accelerometer sensor may detect an acceleration value in each direction (generally, three axes), and detect a value and a direction of gravity when the accelerometer sensor is static, and may be configured to recognize a posture of the network side device (such as screen switching between landscape and portrait modes, a related game, or magnetometer posture calibration), a function related to vibration recognition (such as a pedometer or a knock), and the like. The sensor 505 may further include a fingerprint sensor, a pressure sensor, an iris sensor, a molecular sensor, a gyroscope, a barometer, a hygrometer, a thermometer, an infrared sensor, and the like. Details are not described herein.

The display unit 506 is configured to display information entered by a user or information provided for a user. The display unit 506 may include the display panel 5061, and the display panel 5061 may be configured in a form of a Liquid Crystal Display (LCD), an Organic Light-Emitting Diode (OLED), or the like.

The user input unit 507 may be configured to receive input numeral or character information, and generate key signal input related to user setting and function control of the network side device. In some embodiments, the user input unit 507 includes a touch panel 5071 and other input devices 5072. The touch panel 5071 is also referred to as a touch-screen, and may collect a touch operation performed by a user on or near the touch panel 5071 (for example, an operation performed by a user on the touch panel 5071 or near the touch panel 4071 by using any proper object or accessory, for example, a finger or a stylus). The touch panel 5071 may include two parts: a touch detection apparatus and a touch controller. The touch detection apparatus detects a touch location of the user, detects a signal brought by the touch operation, and sends the signal to the touch controller. The touch controller receives touch information from the touch detection apparatus, converts the touch information into touch point coordinates, sends the touch point coordinates to the processor 510, and receives and executes a command sent by the processor 510. In addition, the touch panel 5071 may be implemented in various types such as a resistor, a capacitor, an infrared ray, or a surface acoustic wave. The user input unit 507 may include other input devices 5072 in addition to the touch panel 5071. In some embodiments, the another input device 5072 may include but is not limited to a physical keyboard, a functional button (such as a volume control button or a power on/off button), a trackball, a mouse, and a joystick. Details are not described herein.

Further, the touch panel 5071 may cover the display panel 5061. When detecting the touch operation on or near the touch panel 5071, the touch panel 5071 transmits the touch operation to the processor 510 to determine a type of touch event, and then the processor 510 provides a corresponding visual output on the display panel 5061 based on the type of the touch event. Although in FIG. 5, the touch panel 5071 and the display panel 5061 are configured as two independent components to implement input and output functions of the terminal device, in some embodiments, the touch panel 5071 and the display panel 5061 can be integrated to implement the input and output functions of the terminal device. Details are not limited herein.

The interface unit 508 is an interface for connecting an external apparatus with the network side device 500. For example, the external apparatus may include a wired or wireless headphone port, an external power supply (or a battery charger) port, a wired or wireless data port, a storage card port, a port used to connect to an apparatus having an identification module, an audio Input/Output (I/O) port, a video I/O port, an earphone port, and the like. The interface unit 508 may be configured to receive an input (for example, data information or power) from an external apparatus and transmit the received input to one or more elements in the network side device 500, or transmit data between the network side device 500 and the external apparatus.

The memory 509 may be configured to store a software program and various data. The memory 509 may mainly include a program storage area and a data storage area. The program storage area may store an operating system, an application required by at least one function (such as a sound play function or an image play function), and the like. The data storage area may store data (such as audio data or an address book) created based on use of the mobile phone, and the like. In addition, the memory 509 may include a highspeed random access memory, and may further include a nonvolatile memory, for example, at least one magnetic disk storage device, a flash storage device, or another volatile solid-state storage device.

The processor 510 is a control center of the network side device and connects all parts of the network side device using various interfaces and circuits. By running or executing software programs and/or modules stored in the memory 509 and by calling data stored in the memory 509, the processor implements various functions of the network side device and processes data, thus performing overall monitoring on the network side device. The processor 510 may include one or more processing units. In some embodiments, an application processor and a modem processor may be integrated into the processor 510. The application processor mainly processes an operating system, a user interface, an application, and the like. The modem processor mainly processes wireless communications. It can be understood that, the modem processor may not be integrated into the processor 510.

The network side device 500 may further include the power supply 511 (such as a battery) supplying power to each component. In some embodiments, the power supply 511 may be logically connected to the processor 510 by using a power management system, so as to implement functions such as charging management, discharging management and power consumption management by using the power management system.

In addition, the network side device 500 further includes some function modules not shown, and details are not described herein.

Embodiments of the present disclosure also provide a communication device, including a processor, a memory, and a computer program stored on the memory and executable on the processor. When the computer program is executed by the processor, the resource determining method as described above is realized, or each process of the embodiment of the resource indication method as described above is realized, and the same technical effect can be achieved. To avoid repetition, this is not repeated herein.

Embodiments of the present disclosure further provide a computer readable storage medium. The computer readable storage medium stores a computer program. When the computer program is executed by the processor, the resource determining method as described above is realized, or each process of the embodiment of the resource indication method as described above is realized, and the same technical effect can be achieved. To avoid repetition, this is not repeated herein. The computer-readable storage medium includes a Read-only Memory (ROM), a Random Access Memory (RAM), a magnetic disk, or an optical disc.

It should be noted that, in this specification, the terms "include", "comprise", or their any other variant is intended to cover a non-exclusive inclusion, so that a process, a method, an article, or an apparatus that includes a list of elements not only includes those elements but also includes other elements which are not expressly listed, or further includes elements inherent to such process, method, article, or apparatus. In the absence of more restrictions, an element defined by the statement "including a . . . " does not preclude the presence of other identical elements in the process, method, article, or apparatus that includes the element.

It may be clearly understood by a person skilled in the art that, for convenience and brevity of description, for a specific working process of the foregoing described system, apparatus, and unit, reference may be made to a corresponding process in the foregoing method embodiments, and details are not described herein again.

In the embodiments provided in this application, it should be understood that the disclosed apparatus and method may be implemented in another manner. For example, the described apparatus embodiment is merely an example. For example, the unit division is merely logical function division. In actual implementation, there may be another division manner. For example, multiple units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one place, or may be distributed on multiple network units. Some or all of the units may be selected based on an actual requirement to implement the objectives of the solutions in the embodiments.

In addition, functional units in the embodiments of the present disclosure may be integrated into one processing unit, or each of the units may exist alone physically, or two or more units are integrated into one unit.

Based on the descriptions of the foregoing implementations, a person skilled in the art may clearly understand that the method in the foregoing embodiment may be implemented by software in addition to a necessary universal hardware platform or by hardware only. Based on such understanding, the technical solutions of the present disclosure essentially or the part contributing to the prior art may be implemented in a form of a software product. The computer software product is stored in a storage medium (such as a ROM/RAM, a magnetic disk, or an optical disc), and includes several instructions for instructing a terminal (which may be a mobile phone, a computer, a server, an air conditioner, a network device, or the like) to perform the method described in the embodiments of the present disclosure.

A person of ordinary skill in the art may understand that all or some of the processes in the methods in the foregoing embodiments may be implemented by using a computer program to control related hardware. The program may be stored in a computer readable storage medium. When the program is executed, the processes in the foregoing methods embodiments may be performed. The foregoing storage medium may include: a magnetic disk, an optical disc, a Read-Only Memory (ROM), a Random Access Memory (RAM), or the like.

It may be understood that the embodiments described in the embodiments of the present disclosure may be implemented by hardware, software, firmware, middleware, microcode, or a combination thereof. For implementation with hardware, the module, unit, and subunit may be implemented in one or more Application Specific Integrated Circuits (ASIC), a Digital Signal Processing (DSP), a DSP Device (DSPD), a Programmable Logic Device (PLD), a Field-Programmable Gate Array (FPGA), general processors, controllers, micro-controllers, micro-processors, and other electronic units for implementing the functions of the present application, or their combinations.

For software implementation, the technology in the embodiments of the present disclosure may be implemented through modules (for example, procedures or functions) that perform the functions in the embodiments of the present disclosure. A software code may be stored in the memory and executed by the processor. The memory may be implemented in the processor or outside the processor.

The embodiments of the present disclosure are described above with reference to the accompanying drawings, but the present disclosure is not limited to the above specific implementations, and the above specific implementations are only illustrative and not restrictive. Under the enlightenment of the present disclosure, those of ordinary skill in the art can make many forms without departing from the purpose of the present disclosure and the protection scope of the claims, all of which fall within the protection of the present disclosure.

What is claimed is:

1. A method for resource determination, performed by a user side device, comprising:

obtaining time domain resource indication information of downlink control information (DCI), wherein the time domain resource indication information supports scheduling of multiple carriers or bandwidth parts (BWPs); and determining a scheduling time domain resource on the multiple carriers or BWPs according to the time domain resource indication information, wherein the time domain resource indication information comprises an indication identifier of the time domain resource, and the indication identifier is configured for indicating an indication index identifier of time domain resource allocation values of a plurality of cells, wherein the obtaining time domain resource indication information of DCI comprises:

determining, according to configuration information of a candidate resource scheduled by the DCI, a first indicator field corresponding to the time domain resource indication information in the DCI; and obtaining the time domain resource indication information according to the first indicator field, wherein the determining, according to configuration information of a candidate resource scheduled by the DCI, a first indicator field corresponding to the time domain resource indication information in the DCI comprises:

obtaining, according to configuration information of each carrier or BWP in the candidate resource, a size of a second indicator field corresponding to each carrier or BWP; and determining a size of the first indicator field according to the size of the second indicator field.

2. The method according to claim 1, wherein the determining a size of the first indicator field according to the second indicator field comprises:

using a sum of sizes of all second indicator fields as the size of the first indicator field; or using a size of the largest second indicator field among all second indicator fields as the size of the first indicator field.

3. The method according to claim 1, wherein the determining, according to configuration information of a candidate resource scheduled by the DCI, a first indicator field corresponding to the time domain resource indication information in the DCI comprises:

when the candidate resource comprises multiple carrier groups or BWP groups, obtaining, according to configuration information of the multiple carrier groups or BWP groups, a size of a third indicator field corresponding to each carrier group or BWP group; and

determining a size of the first indicator field according to the size of the third indicator field.

4. The method according to claim 3, wherein the determining a size of the first indicator field according to the size of the third indicator field comprises:

using a size of the largest third indicator field among all third indicator fields as the size of the first indicator field;

or obtaining the size L of the first indicator field according to a formula $L=S_{MAX}*N$, wherein $S_{MAX}$ is a size of the largest single carrier or BWP indicator field in the multiple carrier groups or BWP groups, and N is the maximum number of carriers or BWPs of the multiple carrier groups or BWP groups in the candidate resource; or using a size of the largest single carrier or BWP indicator field in the multiple carrier groups or BWP groups as the size of the first indicator field.

5. The method according to claim 1, wherein the determining, according to configuration information of a candidate resource scheduled by the DCI, a first indicator field corresponding to the time domain resource indication information in the DCI comprises:

selecting the size of the first indicator field based on a preset strategy according to whether the DCI schedules a single carrier or a BWP.

6. The method of claim 5, wherein the preset strategy comprises:

obtaining, when the DCI schedules a single carrier or BWP, the size of the first indicator field according to configuration information of the scheduled carrier or BWP; and when the DCI does not schedule a single carrier or BWP, obtaining a size of a fourth indicator field corresponding to each carrier group or BWP group according to the configuration information of the multiple carrier groups or BWP groups in the candidate resource, and using a size of the largest fourth indicator field among all fourth indicator fields as the size of the first indicator field, or using a size of the largest single carrier or single BWP indicator field in the multiple carrier groups or BWP groups as the size of the first indicator field, or obtaining the size L' of the first indicator field according to a formula $L'=S'_{MAX}*N$, wherein $S'_{MAX}$ is a size of the largest single carrier or BWP indicator field in the multiple carrier groups or BWP groups, and N is the maximum number of carriers or BWPs of the multiple carrier groups or BWP groups in the candidate resource; or obtaining the size of the first indicator field according to configuration information of a reference carrier or BWP in the candidate resource.

7. The method according to claim 1, wherein the determining, according to configuration information of a candidate resource scheduled by the DCI, a first indicator field corresponding to the time domain resource indication information in the DCI comprises:

obtaining the size of the first indicator field according to configuration information of a reference carrier or BWP in the candidate resource.

8. The method according to claim 1, wherein the determining a scheduling time domain resource on the multiple carriers or BWPs according to the time domain resource indication information comprises:

when the DCI schedules a reference carrier or BWP, the scheduling time domain resource is a time domain resource indicated by the time domain resource indication information; and when the DCI schedules a non-reference carrier or BWP, determining the scheduling time domain resource according to a time domain position of scheduling the reference carrier or BWP.

9. The method according to claim 1, wherein in the first indicator field, subfields corresponding to carriers or BWPs are arranged in an order of first identifiers; or subfields corresponding to carriers or BWPs are allocated with high or low bits for respective time domain resource indications.

10. The method according to claim 1, wherein the time domain resource indication information comprises:

first indication information; and second indication information, wherein the first indication information is a shared indication of the carriers or BWPs, and the second indication information is independent indications of carriers or BWPs.

11. The method according to claim 10, wherein the first indication information is a slot indication, and the second indication information is a symbol indication in a slot; or the first indication information is a symbol indication in a slot, and the second indication information is a slot indication.

12. The method according to claim 1, after the determining a scheduling time domain resource on the multiple carriers or BWPs according to the time domain resource indication information, further comprising:

when the scheduling time domain resource conflicts with an uplink and downlink configuration of a corresponding carrier or BWP, determining that the scheduling time domain resource is invalid.

13. A user side device, comprising:

a memory storing a computer program; and a processor coupled to the memory and configured to execute the computer program to perform operations comprising:

obtaining time domain resource indication information of downlink control information (DCI), wherein the time domain resource indication information supports scheduling of multiple carriers or bandwidth parts (BWPs); and determining a scheduling time domain resource on the multiple carriers or BWPs according to the time domain resource indication information, wherein the time domain resource indication information comprises an indication identifier of the time domain resource, and the indication identifier is configured for indicating an indication index identifier of time domain resource allocation values of a plurality of cells, wherein the obtaining time domain resource indication information of DCI comprises:

determining, according to configuration information of a candidate resource scheduled by the DCI, a first indicator field corresponding to the time domain resource indication information in the DCI; and obtaining the time domain resource indication information according to the first indicator field, wherein the determining, according to configuration information of a candidate resource scheduled by the DCI, a first indicator field corresponding to the time domain resource indication information in the DCI comprises:

obtaining, according to configuration information of each carrier or BWP in the candidate resource, a size of a second indicator field corresponding to each carrier or BWP; and determining a size of the first indicator field according to the size of the second indicator field.

14. The user side device according to claim 13, wherein the determining a size of the first indicator field according to the second indicator field comprises:

using a sum of sizes of all second indicator fields as the size of the first indicator field; or using a size of the largest second indicator field among all second indicator fields as the size of the first indicator field.

15. A non-transitory computer-readable storage medium, storing a computer program, wherein the computer program, when executed by a processor of a user side device, causes the processor to perform operations comprising:

obtaining time domain resource indication information of downlink control information (DCI), wherein the time domain resource indication information supports scheduling of multiple carriers or bandwidth parts (BWPs); and determining a scheduling time domain resource on the multiple carriers or BWPs according to the time domain resource indication information, wherein the time domain resource indication information comprises an indication identifier of the time domain resource, and the indication identifier is configured for indicating an indication index identifier of time domain resource allocation values of a plurality of cells, wherein the obtaining time domain resource indication information of DCI comprises:

determining, according to configuration information of a candidate resource scheduled by the DCI, a first indicator field corresponding to the time domain resource indication information in the DCI; and obtaining the time domain resource indication information according to the first indicator field, wherein the determining, according to configuration information of a candidate resource scheduled by the DCI, a first indicator field corresponding to the time domain resource indication information in the DCI comprises:

obtaining, according to configuration information of each carrier or BWP in the candidate resource, a size of a second indicator field corresponding to each carrier or BWP; and determining a size of the first indicator field according to the size of the second indicator field.

\* \* \* \* \*